Jan. 28, 1969 J. M. WHITED 3,424,047

TUNING PIN FOR STRINGED INSTRUMENTS

Filed Aug. 29, 1966

INVENTOR
JOHN M. WHITED

BY Max E. Shirk
ATTORNEY

United States Patent Office 3,424,047
Patented Jan. 28, 1969

3,424,047

TUNING PIN FOR STRINGED INSTRUMENTS

John M. Whited, 2550 Ardmore Ave., Hermosa Beach, Calif. 90254

Filed Aug. 29, 1966, Ser. No. 575,585
U.S. Cl. 84—202 6 Claims
Int. Cl. G10c 3/10

ABSTRACT OF THE DISCLOSURE

A tuning pin for a piano is provided with a central axial, internally threaded bore and radial slots dividing the mid-portion of the pin, between its ends, into segments to permit radial expansion. A threaded slug in the bore serves to expand the pin to lock it securely in its pin block after a tuning adjustment.

The present invention relates to a new and useful tuning pin for stringed instruments and more particularly to an expandable tuning pin for pianos.

In a conventional piano, a plurality of piano strings are held taut in operative association with a metal sounding board. Metal tuning pins are used to tighten each string a predetermined amount. These pins are mounted in wooden pin blocks passing through the sounding board. The pins include body portions provided with low-pitched external threads for increasing the frictional engagement of the pins with their associated pin blocks.

While generally satisfactory, these prior art tuning pins are subject to certain disadvantages.

One disadvantage resides in the fact that the outside diameter of a tuning pin must be slightly larger than the inside diameter of the tuning block to assure a tight fit so that the pin will not yield under the right angle pull exerted by an associated piano string. This makes it difficult to install a pin in a pin block, initially.

Another disadvantage resides in the fact that the internal diameter of the pin block becomes enlarged after a piano has been tuned a few times making it impossible for the pin to withstand the pull of the associated string without turning. This necessitates replacing the pin block periodically.

In view of the foregoing factors and conditions characteristic of tuning pins for pianos, it is a primary object of the present invention to provide a new and useful tuning pin not subject to the disadvantages enumerated above and having a means for controlling the frictional engagement of a pin in its associated pin block.

Another object of the present invention is to provide a tuning pin of the type described which includes an expandable body portion for controlling frictional engagement of the pin with its associated pin block.

A further object of the present invention is to provide a new and useful tuning pin of the type described which includes a hollow body portion having axially-extending slots placed about the periphery thereof and which includes expansion means engageable with the inner side wall of the body portion to expand said body portion into controlled, frictional engagement with an associated pin block.

According to the present invention, a new and useful tuning pin for stringed instruments is provided and includes a head, a neck, a body and a tapered nose. The head is provided with the customary four flat surfaces for turning the pin with the customary tuning hammer. The pin is provided with an internally threaded counterbore extending from the upper end of the head axially through the body portion to the tapered nose. The body portion is provided with the customary low-pitched, external threads for frictionally engaging the pin in a wooden pin block. The body portion is also provided with a plurality of slots extending axially along the body portion and spaced about the periphery thereof. The slots penetrate the counterbore so that a plurality of longitudinal bands are formed about the periphery of the body portion.

An externally-threaded screw, having a tapered nose, may be threaded into the internally-threaded counterbore in such a manner that the tapered nose of the screw expands these longitudinal bands into firm, frictional engagement with an associated pin block.

The features of the present invention which are believed to be novel are set forth with particularity in the appended claims. The present invention, both as to its organization and manner of operation, together with further objects and advantages thereof, may best be understood with reference to the following description taken in connection with the accompanying drawings in which like reference characters refer to like elements in the several views.

Figures 1, 4:
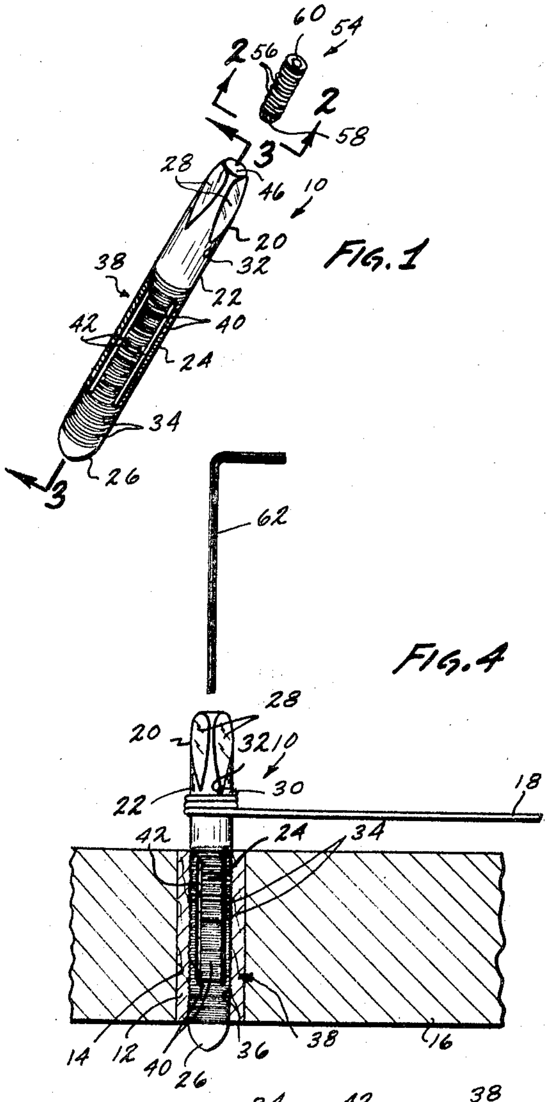
FIGURE 1 is an exploded perspective view of a presently preferred embodiment of a tuning pin of the present invention.
FIGURE 4 is a cross-sectional view of a sounding board having a tuning pin of the present invention mounted in operative association therewith.
Figure 2:
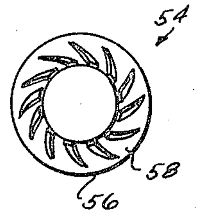
FIGURE 2 is an enlarged, cross-sectional view taken along line 2—2 of FIG. 1.

Referring again to the drawings, and more particularly to FIG. 4, a tuning pin constituting a presently preferred embodiment of the invention, generally designated 10, is shown in combination with a wooden pin block 12 seated in a bore 14 provided in a conventional, piano sounding board 16 for maintaining a piano string 18 taut.

The pin 10 includes a head 20, a neck 22, a body portion 24 and a tapered nose 26. The head 20 is provided with the customary four flat surfaces 28 engageable by a tuning hammer for adjusting the string 18 by coiling it about the neck 22 while one end 30 thereof is held captive in an aperture 32 provided in the neck 22.

The body portion 24 is provided with a plurality of low-pitched external threads 34 engageable with the inner wall 36 of the block 12 for maintaining the pin 10 in tight frictional engagement therewith.

Referring now to the remaining figures, the body portion 24 includes an expandable portion 38 for controlling this frictional engagement. The expandable portion 38 includes a plurality of axially-extending, circumferentially-spaced bands or segments 40 formed on the body portion 24 by communicating a plurality of axially-extending, circumferentially-spaced slots 42 with a counterbore 44 provided in the pin 10 and extending from the upper end 46 of head 20 to the lower end 48 of the body portion 24. The counterbore 44 includes a central, internally-threaded portion 50 and an upper, over sized portion 52 for receiving an expansion means 54.

Figure 3:
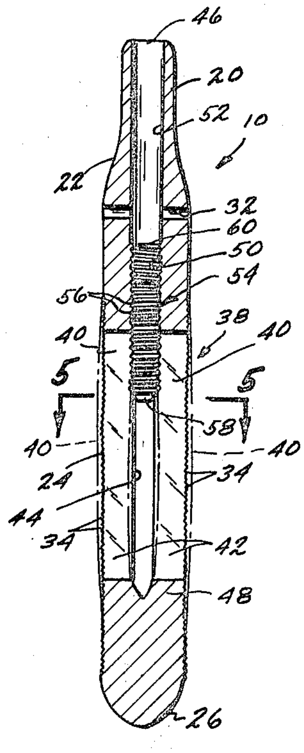
FIGURE 3 is an enlarged, cross-sectional view taken along line 3—3 of FIG. 1.
Figure 5:
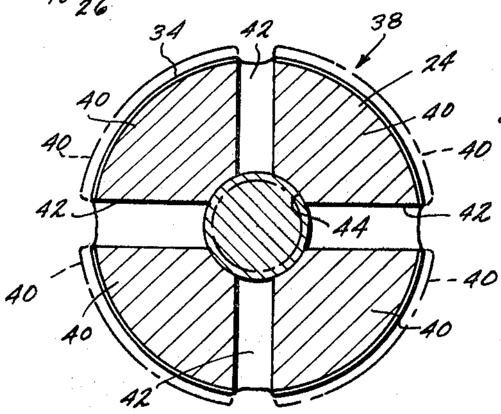
FIGURE 5 is an enlarged, cross-sectional view taken along line 5—5 of FIG. 3.

The expansion means 54 may be operatively associated with the body portion 24 for adjusting the expandable portion 38 to control the frictional engagement thereof with the pin block 12. The expansion means 54 is shown for purposes of illustration, but not of limitation, as comprising an Allen screw having external threads 56 engageable with the internal threads 50, a tapered nose 58 adapted to flex the segments 40 to the broken line position shown in FIG. 3 and a wrench-engaging end 60 adapted to be engaged by an Allen wrench 62 for effecting adjustments of the expansion means 54 within the counterbore 44.

In use, the Allen wrench 62 may be used to install the adjusting means 54 in the counterbore 44 and expand the expandable portion 38 slightly. The pin 10 may then be installed in the pin block 12 and the adjusting means 54 may be given a few turns to further expand the expandable portion 38 bringing the segments 40 into firm, frictional engagement with the pin block 12. The end 30 of string 18 may then be inserted through aperture 32, whereupon the pin 10 may be adjusted to tune the string 18.

Should the inner wall 36 of pin block 12 become worn after several tunings of the string 18, it is only necessary to drive the adjusting means 54 deeper into the counterbore 44 further expanding the segments 40 into tighter engagement with the pin block 12.

What is claimed is:

1. In combination with a hollow pin block for a stringed musical instrument, a tuning pin, comprising:
- a body portion adapted to frictionally engage within said pin block, said body portion including a radially expandable central portion intermediate the ends thereof for controlling said frictional engagement;
- expansion means operatively associated with said body portion for expanding said expandable portion to control said frictional engagement; and
- a neck portion provided on said body portion, said neck portion being provided with a string-receiving aperture for connecting a music string to said pin.

2. A combination as stated in claim 1 including a non-expandable nose portion on said body portion.

3. A combination as stated in claim 1 including low-pitched, external threads provided on said body portion for providing the frictional engagement thereof with said pin block.

4. A combination as stated in claim 1 wherein said expandable portion comprises:
- a counterbore provided in said body portion; and
- a plurality of axially-extending, circumferentially-spaced slots provided on said body portion in communication with said counterbore for forming a plurality of axially-extending, circumferentially-spaced, expandable segments at said central portion of said body portion.

5. A combination as stated in claim 4 wherein said counterbore is provided with an internally threaded portion inwardly of said central portion and wherein said expansion means comprises an externally-threaded member engageable in said internally-threaded portion for expanding said segments.

6. A combination as stated in claim 5 wherein said expansion means includes a tapered nose portion engaging said segments to cause said expansion.

References Cited

UNITED STATES PATENTS 941,730 11/1909 Stack et al. ---------- 84—202

RICHARD B. WILKINSON, *Primary Examiner.*

J. F. GONZALES, *Assistant Examiner.*